(12) United States Patent
Kobayashi et al.

(10) Patent No.: US 6,490,681 B1
(45) Date of Patent: Dec. 3, 2002

(54) ELECTRONIC WATERMARKING SYSTEM

(75) Inventors: Seiji Kobayashi; Shuichi Shimizu, both of Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,406

(22) Filed: Jul. 14, 1998

(30) Foreign Application Priority Data

Sep. 18, 1997 (JP) ............................................... 9-253761

(51) Int. Cl.[7] .................................................. G06F 1/24
(52) U.S. Cl. ....................................... 713/171; 713/176
(58) Field of Search ............................... 380/277, 278, 380/283; 713/171, 176, 180

(56) References Cited

U.S. PATENT DOCUMENTS

| | | | |
|---|---|---|---|
| 4,776,013 A | | 10/1988 | Kafri et al. |
| 4,943,093 A | * | 7/1990 | Melling et al. ............... 283/83 |
| 5,493,677 A | | 2/1996 | Balogh et al. |
| 5,530,759 A | | 6/1996 | Braudaway et al. |
| 5,568,550 A | | 10/1996 | Ur |
| 5,664,018 A | * | 9/1997 | Leighton ..................... 380/54 |
| 5,915,027 A | * | 6/1999 | Cox et al. .................... 380/54 |
| 5,949,885 A | * | 9/1999 | Leighton ..................... 380/54 |
| 6,021,196 A | * | 2/2000 | Sandford, II et al. ........... 380/4 |
| 6,037,984 A | * | 3/2000 | Isnardi et al. ............... 348/403 |

OTHER PUBLICATIONS

Digital Image Scrambling Method for Information Distribution.

"A Secure, Imperceptable yet Perceptually Salient, Spread Spectrum Watermark for Multimedia" I.J. Cox, J. Kilian, T. Leighton and T. Shamoon.

"A Secure, Robust Watermark for Multimedia", I.J. Cox, J. Kilian. T. Leighton and T. Shamoon, NEC Research Institute, Princeton, NJ 08540, Information Hiding, First Int'l. Workshop, Cambridge, U.K., May 30–Jun. 1, 1996 Proceddings.

"Secure Spread Spectrum Watermarking for Images, Audio and Video", I.J. Cox, J. Kilian, T. Leighton and T. Shamoon, 1996 IEEE.

"Secure Spread Spectrum Watermarking for Multimedia" I.J. Cox, J. Kilian, T. Leighton and T. Shamoon.

"A Digital Watermark", R.G. van Schyndel, A.Z. Tirkel and C.F. Osborne, 1994 IEEE.

U.S. Application Ser. No. 08/738,930 to G.W. Braudaway et al., entitled, "Protecting Images with an Image Watermark", filed Oct. 28, 1996.

* cited by examiner

Primary Examiner—Thomas R. Peeso
(74) Attorney, Agent, or Firm—Thomas A. Beck; Daniel P. Morris

(57) ABSTRACT

An electronic watermarking system that impartially performs the deletion of a visible mark and the embedding of an invisible mark. Since the deletion of the visible mark and the embedding of the invisible mark are not performed sequentially but in parallel, even when a memory snapshot is taken during the process, it is difficult to acquire original image data where neither a visible mark nor an invisible mark is embedded. Furthermore, in a process for deleting a visible mark and embedding an invisible mark, an invisible mark is embedded in an area where a visible mark was embedded. Therefore, even when images are compared before and after the visible mark is deleted, it is difficult to infer from the results that an invisible mark has been newly embedded.

13 Claims, 11 Drawing Sheets

ELECTRONIC WATERMARKING SYSTEM

FIELD OF THE INVENTION

The present invention is directed to the field of watermarking. It is more specifically directed to electronic watermarking systems.

BACKGROUND OF THE INVENTION

A technique for embedding (marking) additional information directly in digital contents is proposed as a means for preventing the illegal copying, transfer and re-distribution of the digital contents. Generally, the marking technique can be sorted into a visible data embedding technique and an audible data embedding technique. The electronic watermarking technique, which is an invisible data embedding technique, is distinctive in that additional information can be embedded with no collateral deterioration of the quality of contents, and in that once data is embedded it is difficult to completely erase it. Since the quality is not deteriorated and invisible/inaudible data are embedded, when the contents are to be distributed or when information such as labeling is embedded, it is visually and audibly difficult to determine whether a mark was actually embedded. On the other hand, according to the conventional visible marking, it is easy to intuitively detect the presence of additional information, while the contents are deteriorated. Thus, the positions where marks can be embedded and the applications of the technique are limited. In addition, when JPEG compression is performed for an image for which a visible mark is provided, unwanted image deterioration occurs in the vicinity of the visible mark because the JPEG compression is not suitable for an image that includes a geometric pattern, such as a logo and a character. Therefore, a system having the functions "embedding a visible mark"→ "erasing a visible mark"→ "embedding an invisible mark" is effective in that it is apparent that information is embedded, and the embedding of information can be performed without the quality of the contents being deteriorated.

The conventional visible information embedding techniques are "Color correct digital watermarking of images" (U.S. Pat. No. 5,530,759) and "Method and apparatus for reducing quantization artifacts in a hierarchical image storage and retrieval system" (U.S. Pat. No. 5,568,570). According to either method, a function for erasing an embedded visible mark and simultaneously embedding invisible information is not provided.

For the purpose of preventing the illegal copying and transfer of digital contents, there is a scrambling technique "Scrambling Digital Image Data for Copyright Protection" (SCIS96-9A). And a technique described in Nikkei Electronics, No. 694, 714 (pp. 17–18), 1997 is proposed as an image distribution system that employs the scrambling technique and the electronic watermarking technique. An outline of this system is shown in FIG. 2. In FIG. 2, scrambling is performed for one part or all of an image to degrade the quality of an image, and when the scrambling is released, the ID number of a user is embedded by the electronic watermarking technique. This system, however, has the following shortcomings. Electronic watermarking information can be erased as is shown in FIG. 3, since the scrambling area and an embedding area do not match, the differences in the images before and after the scrambling is released are acquired so that one part or all of newly embedded electronic watermarking information can be erased. Data can be decoded by using a memory snapshot as is shown in FIG. 4, since the job of releasing the scrambling and the job of embedding electronic watermarking information are not performed in parallel, original image data that is not scrambled and does not include electronic watermarking information can be illegally acquired by obtaining a memory snapshot (damping the memory during the scramble release process).

SUMMARY OF THE INVENTION

To resolve the above shortcomings, it is one object of the present invention to provide an electronic watermarking system and method, and a storage medium including a program for electronic watermarking, that simultaneously and in parallel performs the deletion of additional information from the contents embedded additional information and embeds new additional information.

It is another object of the present invention to provide a method and a system that impartially perform the deletion of a visible mark and the embedding of an invisible mark.

It is an additional object of the present invention to provide a method and a system that make it difficult to acquire original image data when neither a visible mark nor an invisible mark is embedded, even when a memory snapshot is acquired during a process for deleting a visible mark and embedding an invisible mark.

It is a further object of the present invention to provide a contents distribution system and an electronic fingerprinting system that ensure the collection of a charge imposed for the use of the contents.

It is still another object of the present invention to provide a contents distribution system that efficiently arranges a plurality of content sets and distributes them.

To achieve the objects, a method is employed for changing a marking method in accordance with the form used for the employment of digital contents and a change in the possession state, and for embedding other information.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 5:
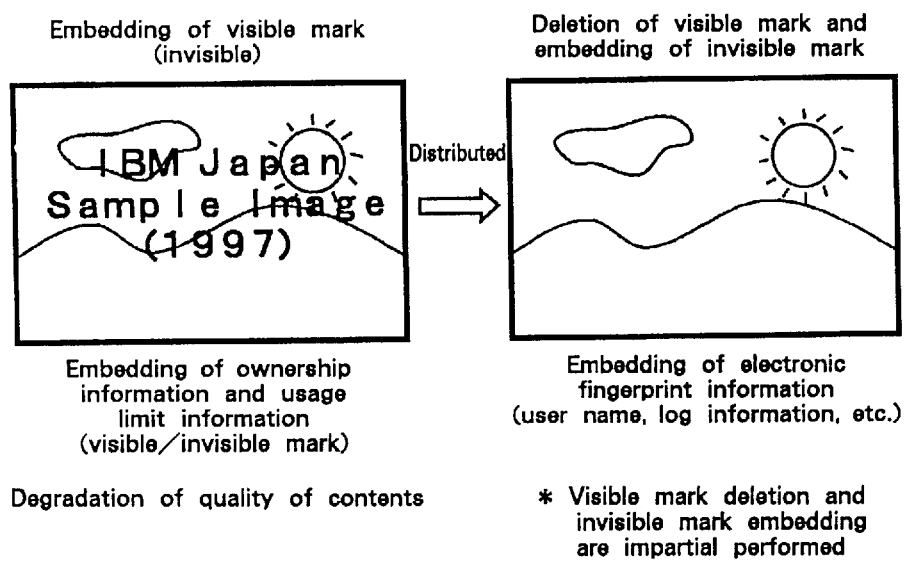
FIG. 5 is a diagram illustrating the outline of a method according to the present invention.

The outline of the present invention is shown in FIG. 5. At the first marking step, information concerning an owner is embedded by visible marking that can easily be discerned without the use of a special detector. At this time, owner information or the like can be embedded as an invisible mark in an area other than where the visible mark is embedded. When an image provided with a visible mark is to be printed (the form is to be changed) or distributed (the ownership is to be altered), at the second step the information that was embedded as a visible mark is deleted and other information (user information) is embedded in a different form (an invisible form).

Figure 6:
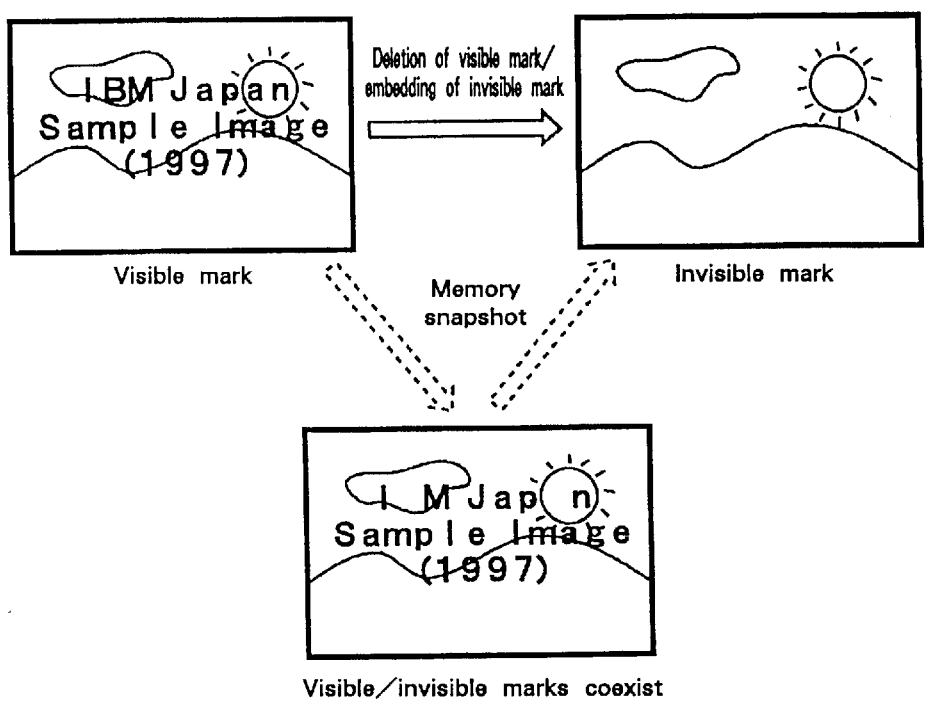
FIG. 6 is a diagram illustrating an example where a memory snapshot is taken by using the method of the present invention.

Since the deletion of the visible mark and the embedding of the invisible mark are not performed sequentially but in parallel (the invisible mark is embedded before the deletion of the visible mark is completed), even when a memory snapshot is taken during the process, it is difficult to acquire original image data where neither a visible mark nor an invisible mark is embedded. This is shown in FIG. 6.

Figure 7:
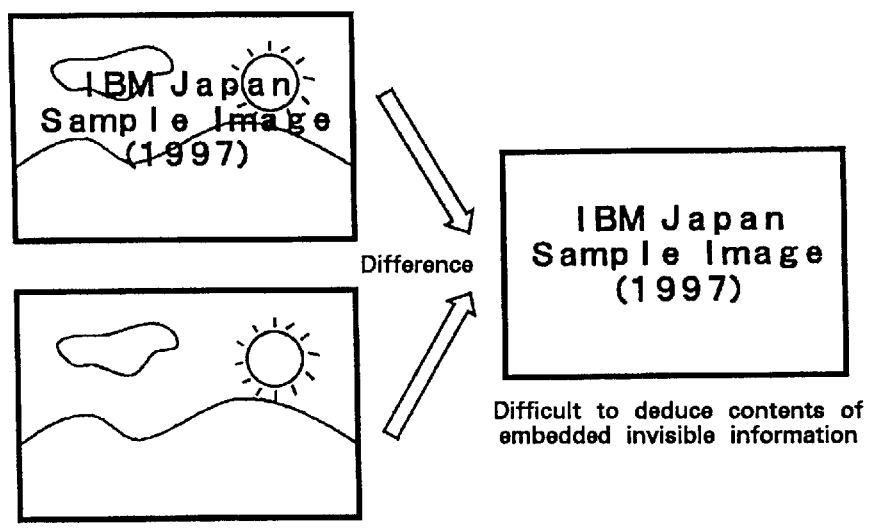
FIG. 7 is a diagram illustrating an example where a difference between images before and after scrambling is released by the method of the present invention.

Furthermore, in a process for deleting a visible mark and embedding an invisible mark, an invisible mark is embedded in an area where a visible mark was embedded. Therefore, even when images are compared before and after the visible mark is deleted, it is difficult to deduce from the differences that an invisible mark has been newly embedded. This is shown in FIG. 7. The deletion of a visible mark and the embedding of an invisible mark are inseparable because these processes are preformed in parallel and because an invisible mark is to be embedded in an area where a visible mark was embedded.

When a visible mark is embedded, information in an invisible form is embedded in an area other than that where the visible mark was embedded. Thus, if electronic fingerprint information, such as the name of a user, is embedded during the deletion of a visible mark, two types of information are embedded in an invisible form. The previously embedded invisible information can not be deleted even by a comparison operation.

Visible marks, such as a company logo and a "sample" mark, are embedded to degrade the quality of the contents, and information concerning a proof of ownership and employment limitations are clearly displayed. As a result, even if the contents are distributed without a visible mark being deleted, the presence of the ownership proof and the employment limitation range can be clearly specified.

Mode of the Invention

Figure 8:
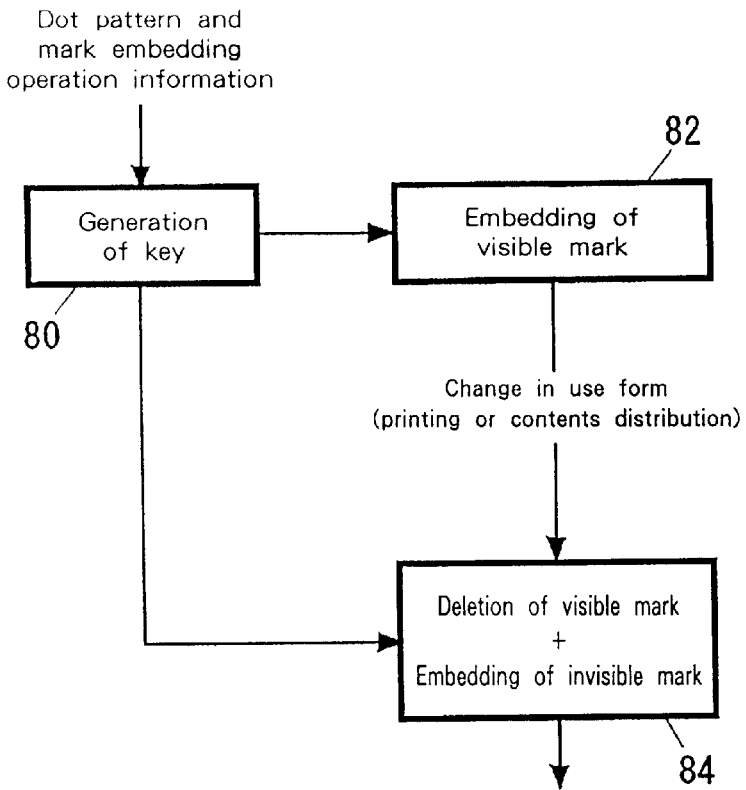
FIG. 8 is a block diagram illustrating a system according to the present invention.
Figure 9:
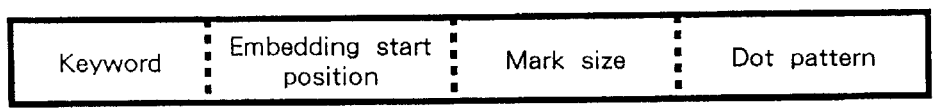
FIG. 9 is a diagram showing a data format example for a key.

FIG. 8 is a block diagram illustrating a system according to the present invention. In block 80, a key is generated that is required for a visible mark embedding/deletion process and an invisible mark embedding process. The key is used in blocks 82 and 84. In block 82, a visible mark is embedded in the contents. Then, the employment form of the contents is changed by printing, distribution or delivery, and in block 84, the visible mark is deleted by using the key, while at the same time, in parallel, an invisible mark is embedded. As is shown in FIG. 9, the key includes a keyword for selecting a reversible operation for embedding a visible mark, a visible mark embedding start position, a mark size, and a mark dot pattern information.

Figure 10:
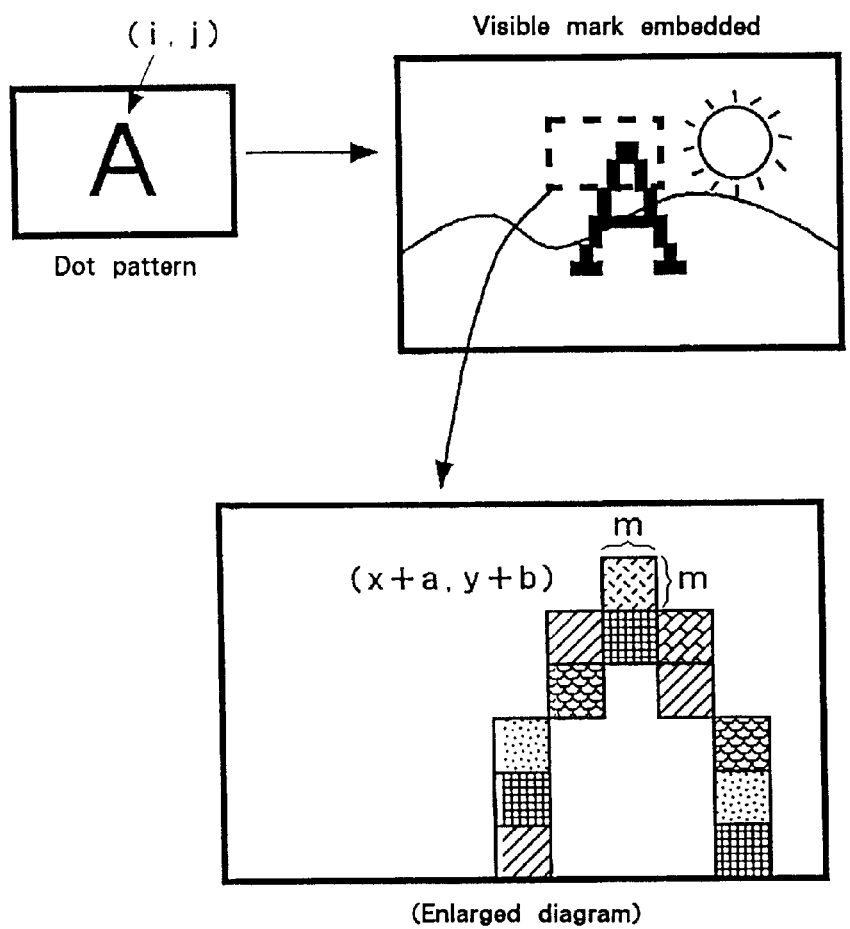
FIG. 10 is a diagram showing a specific example for embedding a visible mark (information)

A method for embedding a visible mark will now be described while referring to FIG. 10. The embedding of a visible mark is performed by mapping on an original image a dot pattern transmitted by using the key. Information received by using the key is employed to perform the visible mark embedding operation. To perform the mapping of a dot pattern on an original image, when dot pattern d(i,j) transmitted by using the key is either ON or OFF, a reversible operation is added to image components (pixel value/DCT coefficient value) in an m m block, which is designated by point l(x,y) on original image 1 corresponding to d (i,j). Hereinafter an m m block in which a reversible operation is added to image components on an original image is called an "operation target block" (see the enlarged diagram in FIG. 10). The correspondence between original image l(x,y) and dot pattern d(i,j) is, for example, $$(x+a, y+b)=m(i,j)$$

where (a, b) represents a visible data embedding start position. For a JPEG compressed image, block size m is $$m=8n(n=1, 2, 3, \ldots )$$

The reversible operation for the operation target block is performed to select the reverse operation prepared in advance according to a random series generated by a keyword included in a key. The reversible operation is repeated a plurality of times for one operation target block to make the illegal deletion of embedded visible data difficult. An example reversible conversion operation for the target block selected using a key is as follows.

<Rearrangement of Block Pixel Value/DCT Coefficient Value>

The scan order for the pixels in the m m block and the DCT coefficients is rearranged in the block. The following rearrangement method is employed as follows.

Rearrangement of Scan Order for Pixel Values/DCT Coefficient Values

Figure 11:
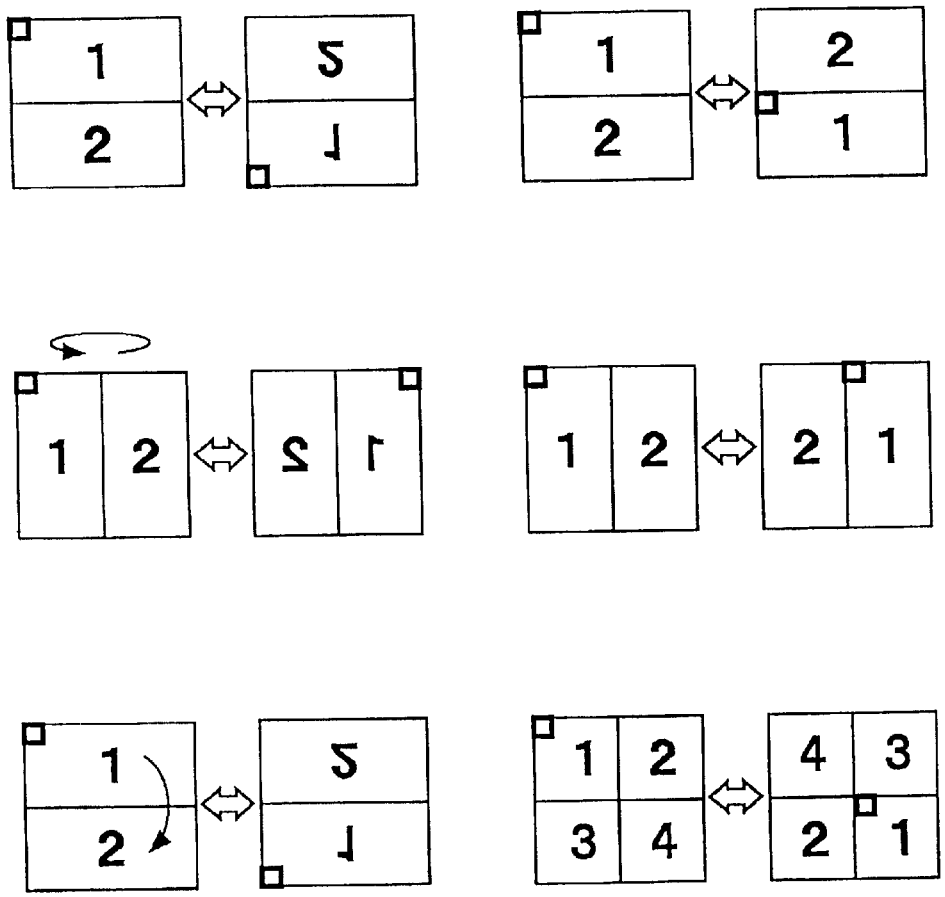
FIG. 11 is a diagram showing rearrangement of the scan order for pixel values/DCT coefficient values.
Figure 12:
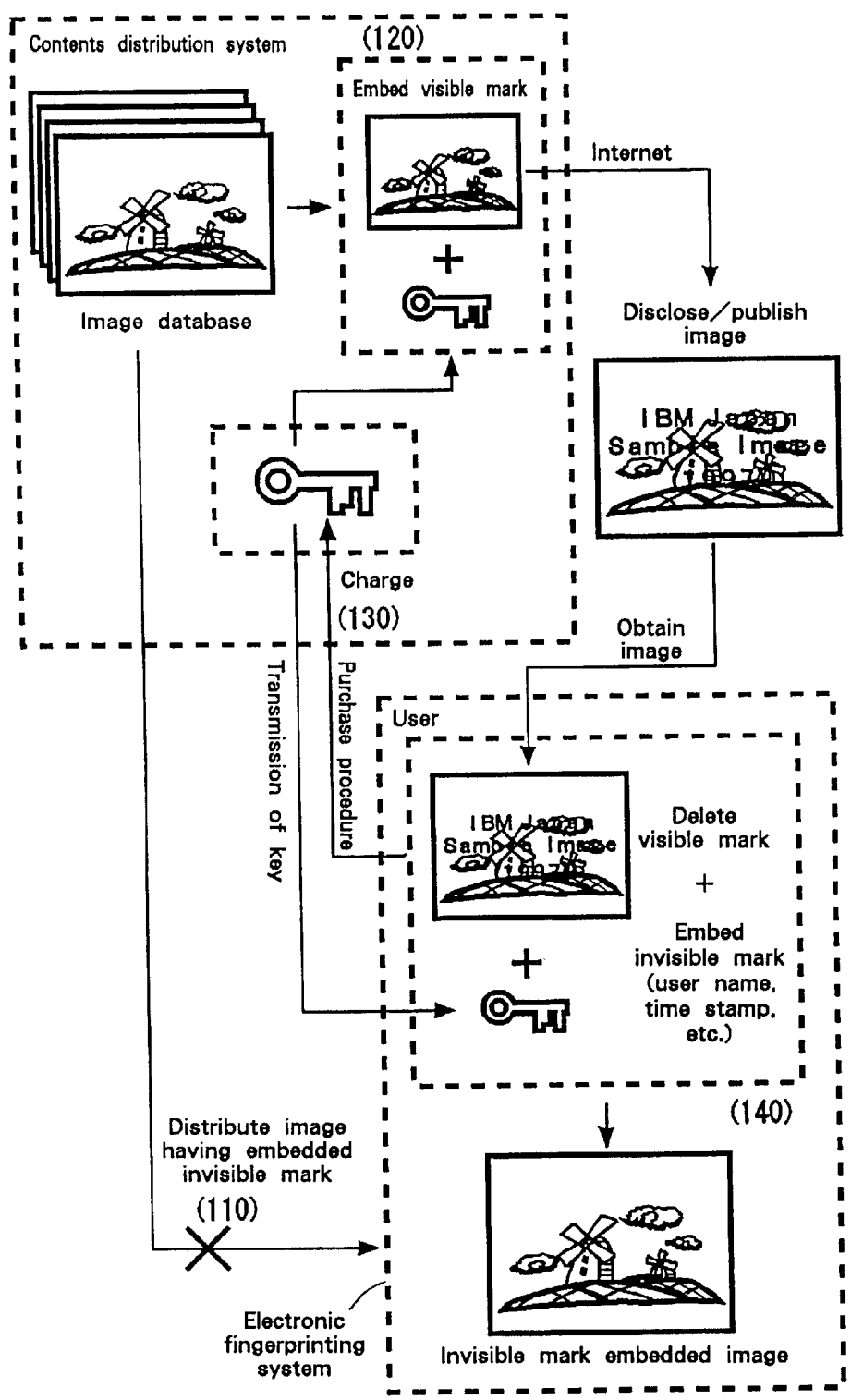
FIG. 12 is a diagram illustrating a contents distribution system and an electronic fingerprinting system.
Figure 13:
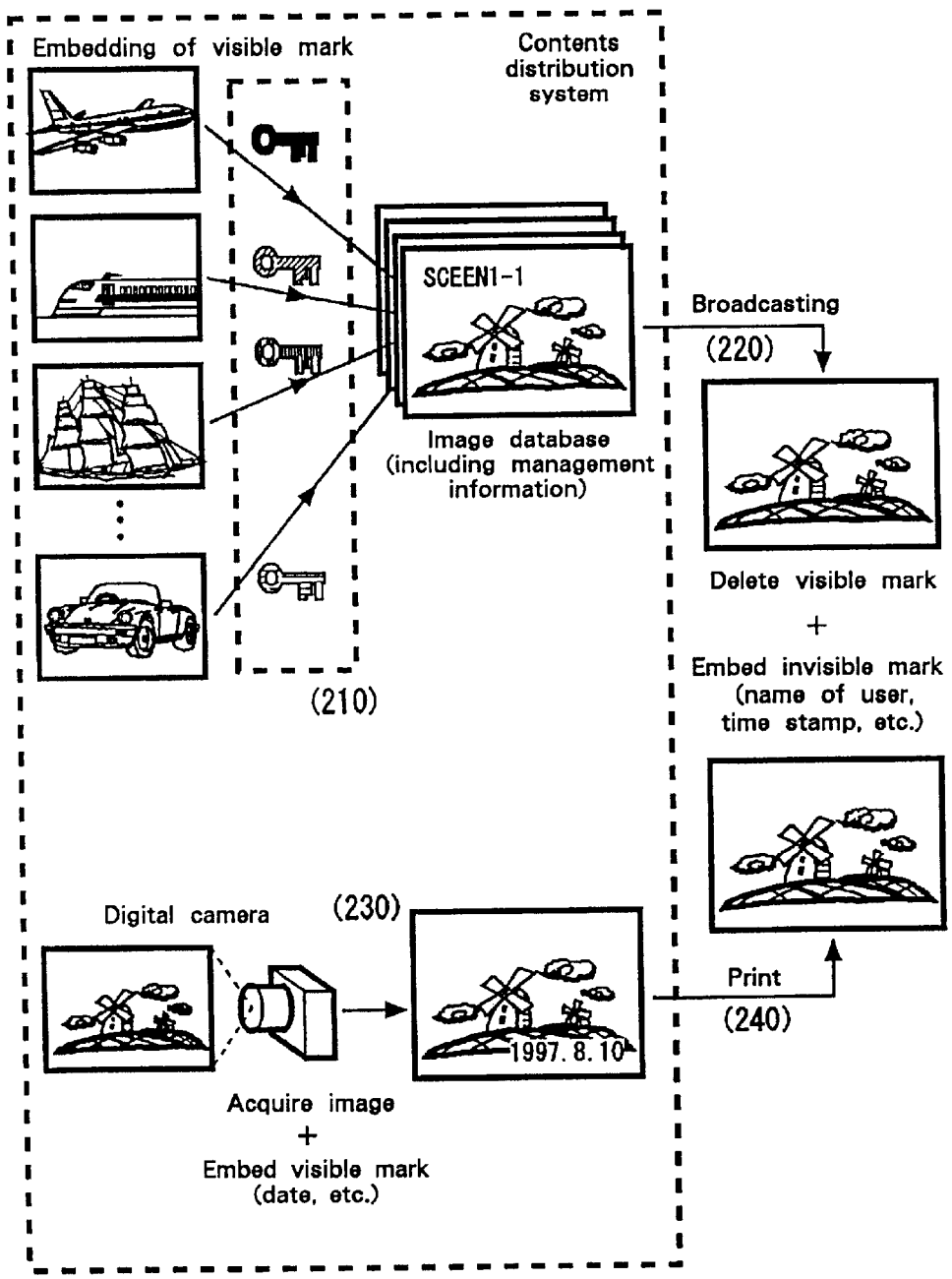
FIG. 13 is as diagram illustrating a contents management and distribution system.

The scan order for the pixels/DCT coefficients in the m m block is rearranged in a predetermined order, and a visible mark is embedded. The rearrangement method is a method for the random scrambling of scan positions in an one-to-one correspondence, or a method for rotating, returning and moving in parallel a block around a specific axis, as is shown in FIG. 11.

Rearrangement of Pixel Values/DCT Coefficient Values Between Color Components

For a color image, the pixel values/DCT coefficient values usually differs in the components (RGB, YUV, etc.) constituting an image. Therefore, corresponding pixel values/DCT coefficient values are exchanged between image components.

<Change in Pixel Values/DCT Coefficient Values in Block>

A visible mark is added by changing the individual pixel values/DCT coefficient values in a block. The change in the pixel values/DCT coefficient values is performed by mapping original values with one-to-one correspondence through calculations including the inverse function. The following operation can be employed as a method for changing the pixel values/DCT coefficient values.

Calculation Using Regular m m Matrix

Operation target block B and regular square matrix A having the same size (m m) are multiplied together. When matrix expression det(A) for A is 1, the elements of the inverse matrix are all integers, so that calculation can be performed without division being required (no rounding error).

<Addition of a Value to Pixel Values/DCT Coefficient Values>

A plurality of pixels or DCT coefficients in an operation target block are selected, and change $\Delta(x,y)$ is calculated in accordance with a random series generated by a keyword included in a key, and is added to the selected pixels/DCT coefficients. When each of the selected pixel values is $B(x,y)$, $B(x,y)=B(x,y)+\Delta B(x,y)$.

<Exclusive-OR of Pixel Values/DCT Coefficient Values>

A specific mask is generated by using a random series generated by the keyword included in a key. An exclusive-OR operation is performed with the mask and the pixel values/DCT coefficient values in an operation target block to change the pixel values/DCT coefficient values.

A deletion process for a visible mark and an embedding process for an invisible mark will now be described. The same key as was used for visible mark embedding is employed, and the reversible operation of the mark embedding operation is performed for an operation target block of an image in which a visible mark is embedded, so that the visible mark is deleted. Simultaneously, an invisible mark is embedded. The invisible mark to be embedded is electronic fingerprint information, such as a time stamp or the name of a user, that is associated with the visible mark deletion activity. The following functions are provided to prevent an illegal activity that may occur when deleting a visible mark and embedding an invisible mark.

<Invisible Mark Embedding Area>

When a visible mark embedding area does not match an invisible mark embedding area, it would be possible for one part or all of a newly invisible mark to be extracted by calculating a difference between images before and after the visible mark is deleted, and for the visible mark to be illegally deleted. To avoid this, after a visible mark is deleted, every new invisible mark should be embedded in an area where the visible mark was embedded. As a result, it is difficult to deduce from the appearances that an invisible mark has been embedded, even by using a difference obtained by comparing the images obtained before and after the visible mark was deleted.

<Impartiality of Visible Mark Deletion/Invisible Mark Embedding Operation>

If the visible mark deletion process and the invisible mark embedding process are sequentially performed, it would be possible for digital data including no visible mark and no invisible mark to be acquired by taking a memory snapshot. To prevent this, the visible mark deletion process and the invisible mark embedding process should be performed in parallel. As a result, it is difficult to separate the visible mark deletion process from the invisible mark embedding process, and even when a memory snapshot is taken at this time, original data including neither a visible mark nor an invisible mark can not be extracted.

<Step-by-step Visible Mark Deletion/Invisible Mark Embedding Process>

Since a visible mark is embedded by repeating the reversible operation a plurality of times, in accordance with a random series acquired from key information the reversible operation is performed a different number of times for each operation target block, and the visible mark is gradually deleted. On the other hand, an invisible mark is embedded at a different timing for each operation target block, while the visible mark has not yet been completely deleted. That is, the embedding of an invisible mark is initiated before the deletion of a visible mark is completed. Therefore, to embed an invisible mark, the reversible operation performed for a embedding operation target block is performed in advance for an embedding pattern, which is in turn added to the target block. And thus, even when a plurality of memory snapshots are taken during the visible mark deletion/invisible mark embedding process, it is difficult to use the differences obtained by comparing snapshot images to determine whether the operation performed for each operation target block is the reversible operation for deleting a visible mark or the invisible embedding operation for embedding a pattern. The visible mark deletion/invisible mark embedding process will be specifically described. First, k–m (m<k) reversible operations are performed for one part of operation target block B(k) in which a visible mark is embedded by the performance of k reversible operations, and the visible mark is partially faded out. Then, the embedding of an invisible mark is begun for the operation target block B(m) in which is located the partially faded out visible mark. For this process, the reversible operation performed to embed the visible mark is performed m times with an embedding pattern P, and the resultant pattern P(m) overwrites the block B(m) in which the faded out visible mark is located. That is, an invisible mark is embedded before the deletion of the visible mark is completed. Finally, the remaining m reversible operations are performed for operation target block B'(m)=B(m)+P(m), which is obtained by adding the pattern P(m), which has performed the reversible operation m times, and a block B' in which the invisible mark is embedded can be obtained. The above described invisible mark embedding sequence is performed at a different timing for each visible mark embedding target block, in accordance with a random series generated by using key information that is received.

Figure 14:
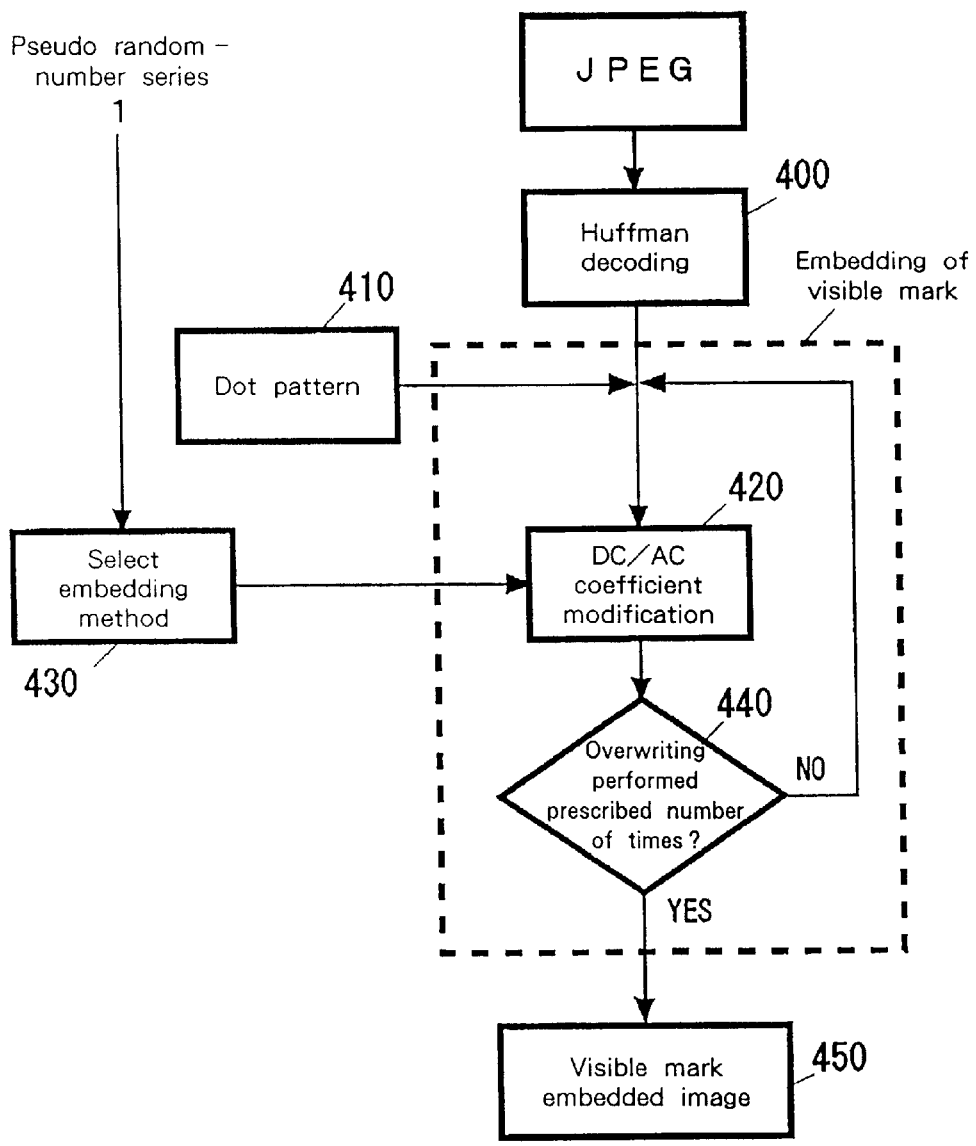
FIG. 14 is a flowchart showing the processing for embedding a visible mark (information)

FIG. 14 is a flowchart showing the processing for embedding a visible mark (information) when a JPEG image constitutes the original contents. At step 400, the JPEG image that constitutes the contents is decoded using Huffman decoding. At step 420, the decoded data, a dot pattern 410 which is embedding information, and an embedding method selection 430 which is specified by using a random series (pseudo random-number series 1) generated using a keyword included in a key, are received, and a DC/AC coefficient modification is performed. A visible mark is embedded by overwriting the DC/AC coefficient a plurality of times in accordance with the selected embedding method. At step 440, a check is performed to determine whether or not the overwriting has been performed the prescribed number of times. If the obtained result is No, program control returns to step 420. If the obtained result is Yes, the embedding of the visible mark is terminated.

Figure 15:
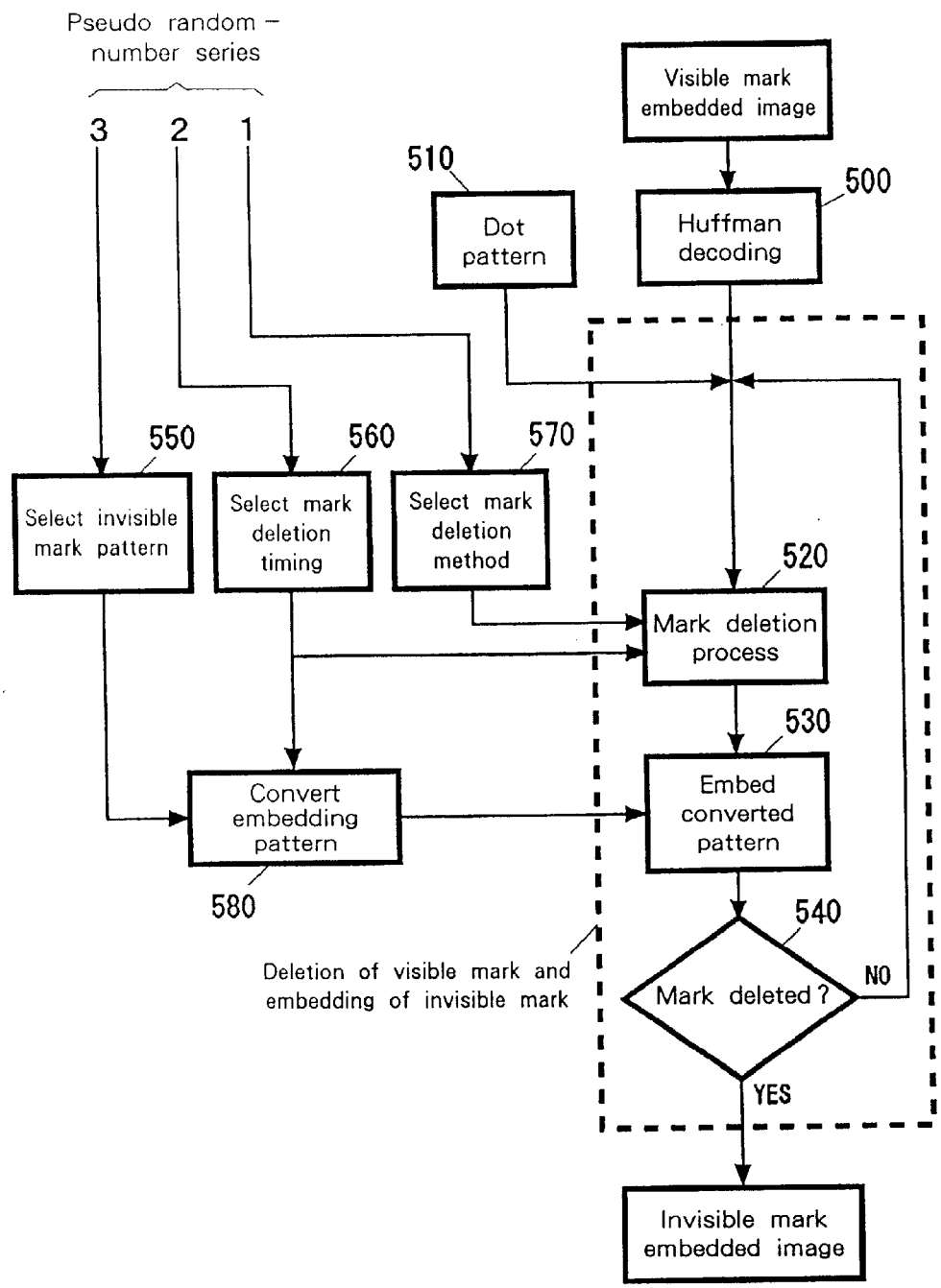
FIG. 15 is a flowchart showing the processing for deleting a visible mark and embedding an invisible mark.

FIG. 15 is a flowchart showing the processing performed to delete a visible mark and to embed an invisible mark when a visible mark is embedded in a JPEG image as additional information. At step 500, a JPEG image in which a visible mark is embedded is decoded using Huffman decoding, and at step 520, the visible mark that is additional information is deleted. At step 530, a converted pattern is embedded, and at step 540 a check is performed to determine whether the visible mark has been deleted. If the result is No, program control returns to step 520. If the result at step 540 is Yes, an image in which an invisible mark is embedded is provided. The most important factors in this processing are that, at step 560, a timing for the deletion of a mark is selected based on a pseudo random-number series 2 generated using a keyword included in a key, and that this timing is used for the simultaneous, parallel performance of the mark deletion at step 520 and the mark embedding at step 530. At step 580, whereat conversion of an embedding pattern is performed, the selected timing at step 560, and an invisible mark pattern, which is selected by using a pseudo random-number series 3 generated using a keyword included in a key, are input.

PREFERRED EMBODIMENT

Figure 1:
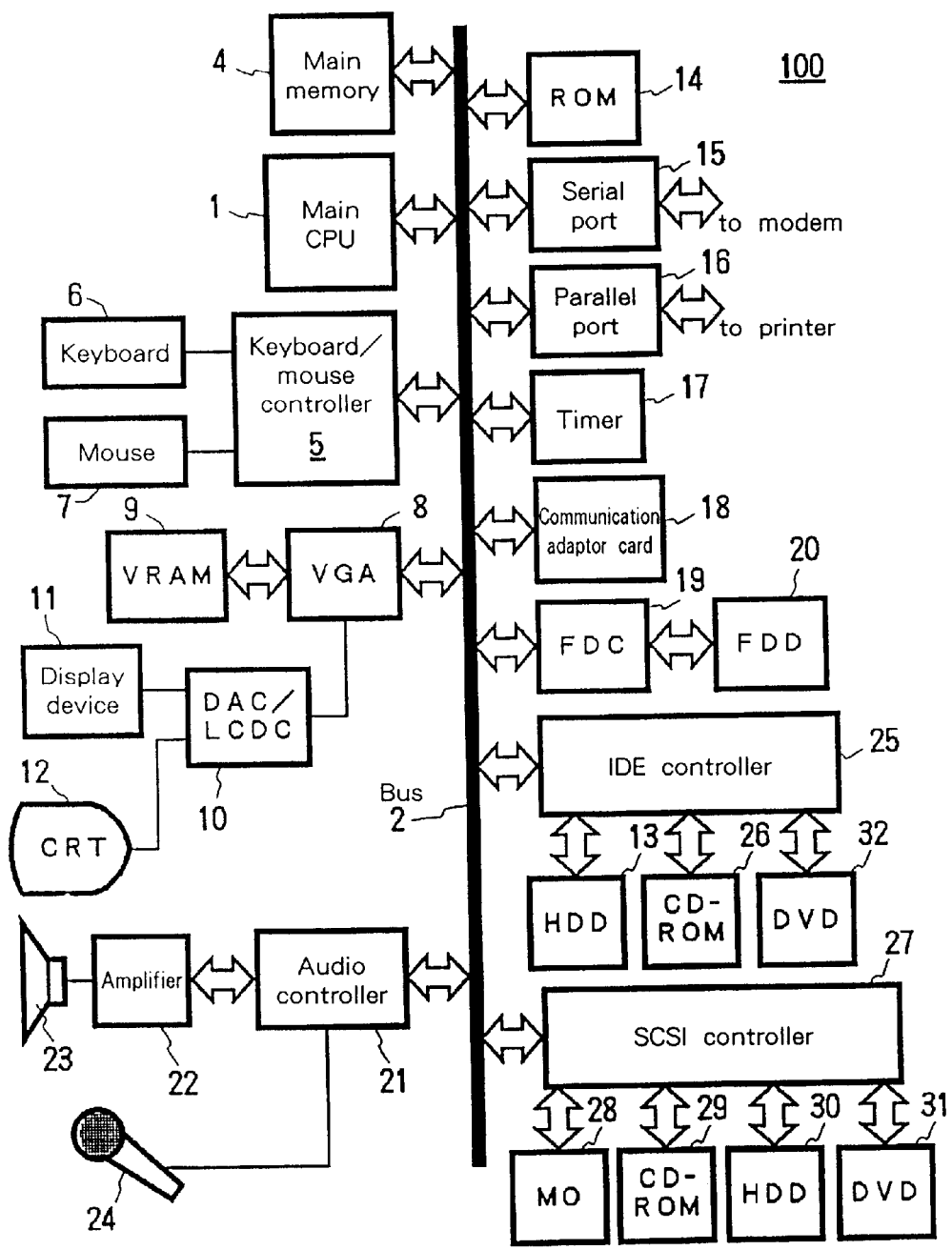
FIG. 1 is a diagram illustrating a hardware arrangement according to one embodiment of the present invention.
Figure 2:
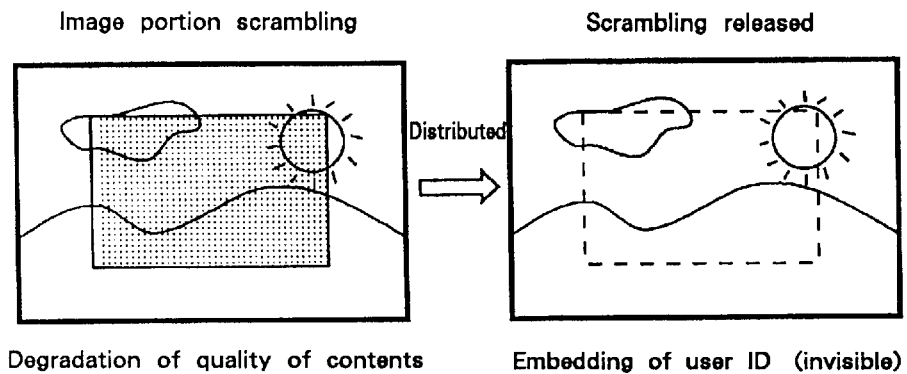
FIG. 2 is a diagram illustrating a conventional image distribution system.
Figure 3:
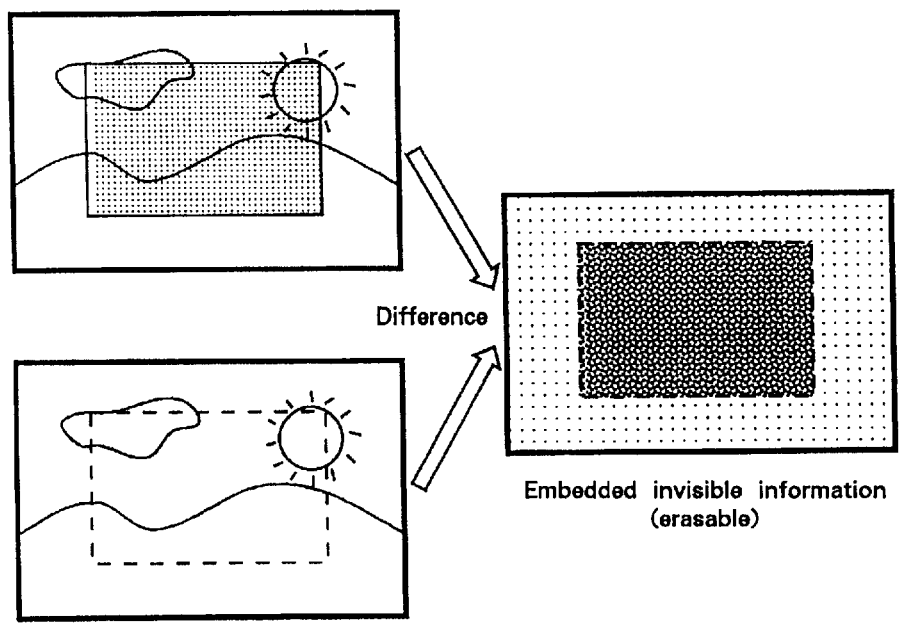
FIG. 3 is a diagram illustrating a conventional example where a difference between images before and after scrambling is released.
Figure 4:
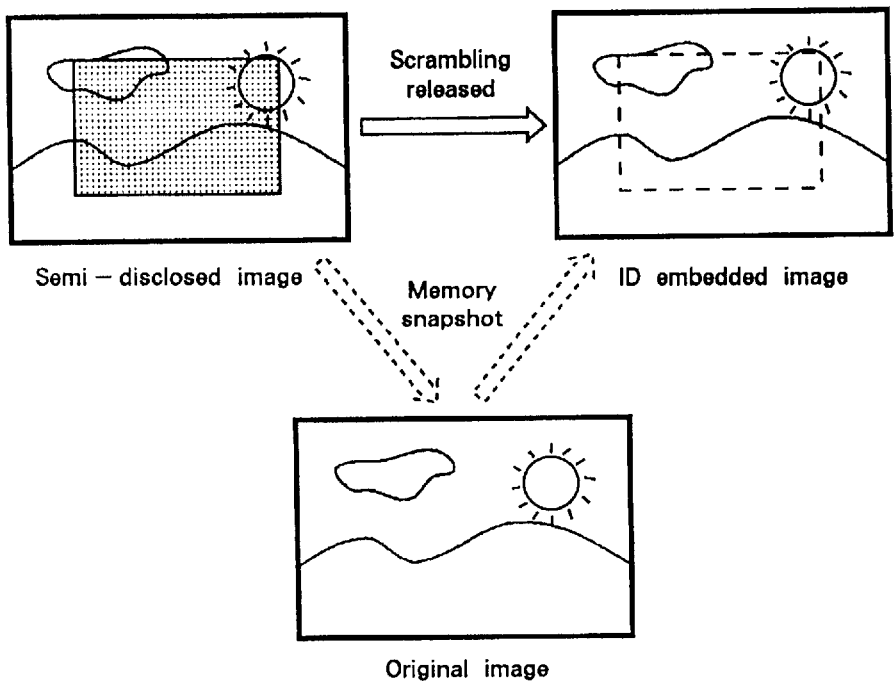
FIG. 4 is a diagram illustrating a conventional example where a memory snapshot is taken.

FIG. 1 is a schematic diagram illustrating an example hardware arrangement for an electronic watermarking system used for the present invention. A system 100 includes a Central Processing Unit (CPU) 1 and a memory 4. The CPU 1 and the memory 4 are connected via a bus 2 to a hard disk drive 13 (or to a driver for such a storage medium as an MO 28, a CD-ROM 29 or a DVD 31), which is an auxiliary storage device, and to an IDE controller 25. The CPU 1 and the memory 4 are also connected via the bus 2 to a hard disk drive 30 (or to a driver for such a storage medium as the MO 28, the CD-ROM 23 or the DVD 31), which is an auxiliary storage device, and to a SCSI controller 27. A floppy disk drive 20 is connected to the bus 2 via a floppy disk controller 19.

A floppy disk is inserted into the floppy disk driver 20. Code or data for a computer program can be recorded on the floppy disk or the hard disk drive 13 (or on such storage medium as the MO 28, the CD-ROM 29 or the DVD 31), or in a ROM 14, so as to interact with an operating system by issuing instructions to the CPU 1 and implementing the present invention. The program can be executed by loading it into the memory 4. The computer program code can be compressed, or can be divided into a plurality of segments that are stored on or in a plurality of storage media.

The system 100 further comprises user interface hardware components, such as a pointing device (a mouse, a joystick, etc.) 7 or a keyboard 6 for data input, or a display 12 for providing visual data for a user. Furthermore, it is possible to connect a printer via a parallel port 16 and a modem via a serial port 15. The system 100 is connected to a network via the serial port 15 and a modem or a communication adaptor 18 (ethernet or a token ring card) for communication with other computers. In addition, a remote control transceiver can be connected to the serial port 15 or the parallel port 16 for the exchange of data using infrared light waves or radio.

An audio controller 21 performs a D/A (digital/analog) conversion of a digital signal it receives to obtain an audio signal, which is supplied to an amplifier 22. The amplifier 22, in turn, supplies the audio signal to a loudspeaker 23, and the loudspeaker 23 outputs the signal as audible sound. The audio controller 21 can also perform an A/D (analog/digital) conversion of audio data received from a microphone 24, and can fetch audio information from outside into the system 100.

It can be easily understood that the electronic watermarking system of the present invention can be accomplished by employing common personal computers (PCs); workstations; notebook PCs; palmtop PCs; network computers; various types of home electronic appliances, such as televisions incorporating computers; game machines that have a communication function; communication terminals, such as telephones, facsimile machines, portable telephones, PHSs or personal digital assistants having a communication function; or a combination of these devices. The components in the embodiment are merely examples, and not all of them are required to implement the present invention.

Systems that apply the electronic watermarking system are as follows.

(1) Electronic Fingerprinting System for the Distribution of Digital Contents

Contents are frequently exchanged on the Internet. A system is provided that maintains the security of copyright information during the distribution of contents across the network, and smoothly exchanges data while maintaining the quality of the contents. In the system for charging for digital contents that are distributed, if invisible marking is performed while high quality of data is maintained, for the use the distributed contents are by no means inferior to the original data (110). Thus, a user may be reluctant to pay the charge.

In the digital contents distribution system of the present invention, a visible mark is embedded in the contents (120), and the transmission of a key that is required to delete the visible mark and the procedure for charging for the contents are interconnected (120). To delete a visible mark, a log (the name of a user, the name of a host, the time, etc.) for which the visible mark was deleted is embedded as invisible information (140). As a result, an electronic fingerprinting system can be provided that can trace when, where and to whom data were transmitted.

(2) Digital Contents Management and Distribution System

In a visual management information embedding system, an enormous quantity of contents are required for video, broadcasting and printing fields. In this environment, the efficient arrangement of contents is a great problem. The contents are moved frequently, even with offices, and when a huge quantity of contents are to be transmitted to a client, an in-house, usually identifiable serial number must be added.

In the digital contents distribution system of the present invention, memo information, such as serial numbers for contents, is temporarily embedded as a visible mark in order to control the movement of the contents and to assist in the arrangement of the contents. Thus, the in-house management of the contents can be performed efficiently (210). When the contents are to be distributed (delivered) to an outside destination, visible information that is intended only for in-house use is removed, and ownership information (copyright information, employment permission information, or employment permission conditions) for the contents is embedded in an invisible form (220). As a result, both the efficient management of contents and the establishment of ownership can be ensured.

Another system can be provided whereby a time stamp having an erasable form is added to an image acquired using a digital camera (230), and whereby the information is deleted at the time of printing (240).

ADVANTAGES OF THE INVENTION

According to the present invention, a method can be provided whereby the deletion of a visible mark and the embedding of an invisible mark are impartially performed. Therefore, it is possible to provide a contents distribution system and an electronic fingerprinting system that ensure the collection of a charge imposed for the use of the contents, and a contents distribution system that efficiently arranges a plurality of content sets and distributes them. Furthermore, when a visible mark is embedded, information in an invisible form is embedded in an area other than that where the visible mark was embedded. Thus, if electronic fingerprint information, such as the name of a user, is embedded during the deletion of a visible mark, two types of information are embedded in an invisible form. The invisible information that was previously embedded can not be deleted even by a comparison operation.

This invention may be used for many applications. Although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. An electronic watermarking system, which deletes additional information embedded in the contents and embeds new additional information in the contents, comprising:

(1) means for deleting additional information A which is visible or audible information from the contents, and
   (2) means for employing an electronic watermarking technique to embed new additional information B which is invisible or inaudible information in an area where said additional information A was embedded, wherein an embedding process is initiated by said means (2) before a deletion process is completed by said means (1); wherein, to delete said additional information A, said means (2) employs the same key as was used to embed said additional information A in said contents.

2. The electronic watermarking system according to claim 1, wherein, to delete said additional information A, said means (2) employs the same key as was used to embed said additional information A in said contents.

3. An electronic watermarking system, which performs an embedding process and a deletion process for additional information relative to the contents, comprising:

(1) means for embedding additional information A, which is visible or audible information, from the contents,
   (2) means for deleting said additional information A from said contents, and
   (3) means for employing an electronic watermarking technique to embed new additional information B, which is invisible or inaudible information, in an area where said additional information A was embedded; wherein said embedding process is initiated by said means (3) before a deletion process is completed by said means (2); and
   wherein, said means (1) embeds said additional information A as visible or audible information, and
   wherein means is provided for employing said electronic watermarking technique to embed additional information C as invisible or inaudible information.

4. The electronic watermarking system according to claim 3, wherein said means (1) embeds said additional information A using a specific key, and said means (2) deletes said additional information A using said specific key.

5. The electronic watermarking system according to claim 3, wherein said means (1) embeds said additional information A using a specific key, and said means (2) deletes said additional information A using said specific key.

6. The electronic watermarking system according to claim 3, wherein said means (1) embeds said additional information A using a specific key, and said means (2) deletes said additional information A using said specific key.

7. A contents distribution system comprising:

(1) means for embedding visible or audible additional information A in the contents using a specific key;
   (2) means for receiving a request of said contents from a user;
   (3) means for charging a fee for said request; and
   (4) means for transmitting said specific key to a user to delete said additional information A from said contents.

8. An electronic fingerprinting system comprising:

(1) means for transmitting a request of contents to a contents distribution system;
   (2) means for receiving from said contents distribution system a key used for deleting visible or audible additional information A in said contents;
   (3) means for using said key to delete said additional information A from said contents; and
   (4) means for employing an electronic watermarking technique to embed new additional invisible or inaudible information B in an area of said contents where said additional information A was embedded,
   wherein an embedding process is initiated by said means (4) before a deletion process is completed by said means (3).

9. A contents management and distribution system comprising:

(1) means for employing different keys for a plurality of contents to embed visible or audible additional information in said plurality of contents for managing said plurality of contents;
   (2) means for, before said contents are distributed, employing said keys used when said additional information A was embedded in said contents to delete said additional information A;
   (3) means for employing an electronic watermarking technique to embed new additional invisible or inaudible information B in areas where said additional information A was embedded; and
   (4) means for distributing said contents in which said additional information B is embedded,
   wherein an embedding process is initiated by said means (3) before a deletion process is completed by said means (2).

10. The system according to claim 9, wherein said additional information A includes identification information, such as a serial number, concerning said contents.

11. The system according to claim 10, wherein said additional information B includes at least one of ownership or employment permission information, or an employment permission condition for said contents.

12. An electronic watermarking method, for deleting additional information embedded in the contents and for embedding new additional information in the contents, comprising the steps of:

(1) deleting additional visible or audible information A from the contents; and
   (2) employing an electronic watermarking technique to embed new additional invisible or inaudible information B in an area where said additional information A was embedded;
   wherein an embedding process is initiated at said step (2) before a deletion process is completed at said step (1).

13. A storage medium including a program for deleting additional information embedded in the contents and for embedding new additional information in the contents, said program comprising:

(1) a function for deleting additional visible or audible information A from the contents, and (2) a function for employing an electronic watermarking technique to embed new additional invisible or inaudible information B to in area where said additional information A was embedded, wherein an embedding process is initiated by said function (2) before a deletion process is completed by said function (1).

* * * * *